J. L. DE BRIONES.
SPEED CHANGING MECHANISM.
APPLICATION FILED JULY 28, 1908.

1,009,954.

Patented Nov. 28, 1911.
6 SHEETS—SHEET 1.

Witnesses
L. B. James
S. M. McColl

Inventor
J. L. de Briones
by H. B. Willson &co
Attorneys

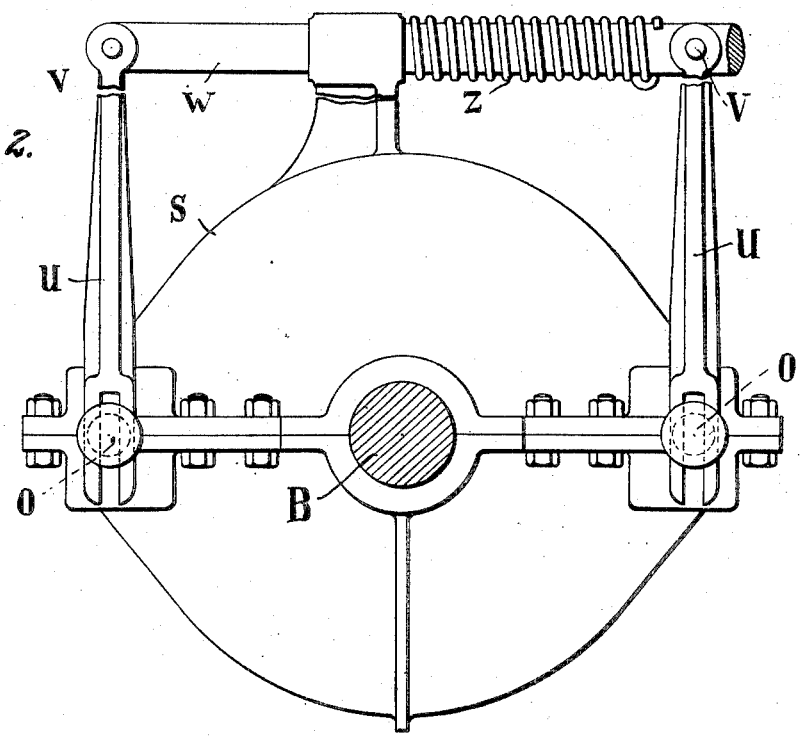
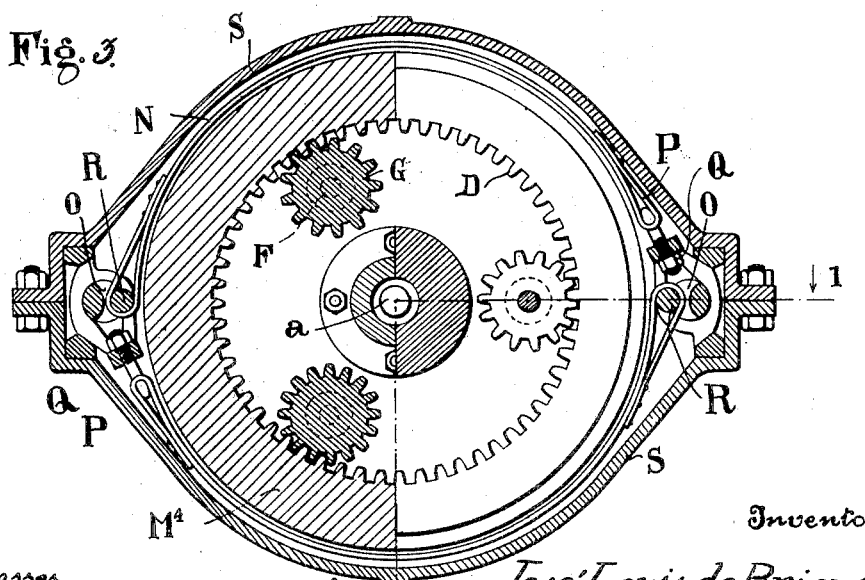

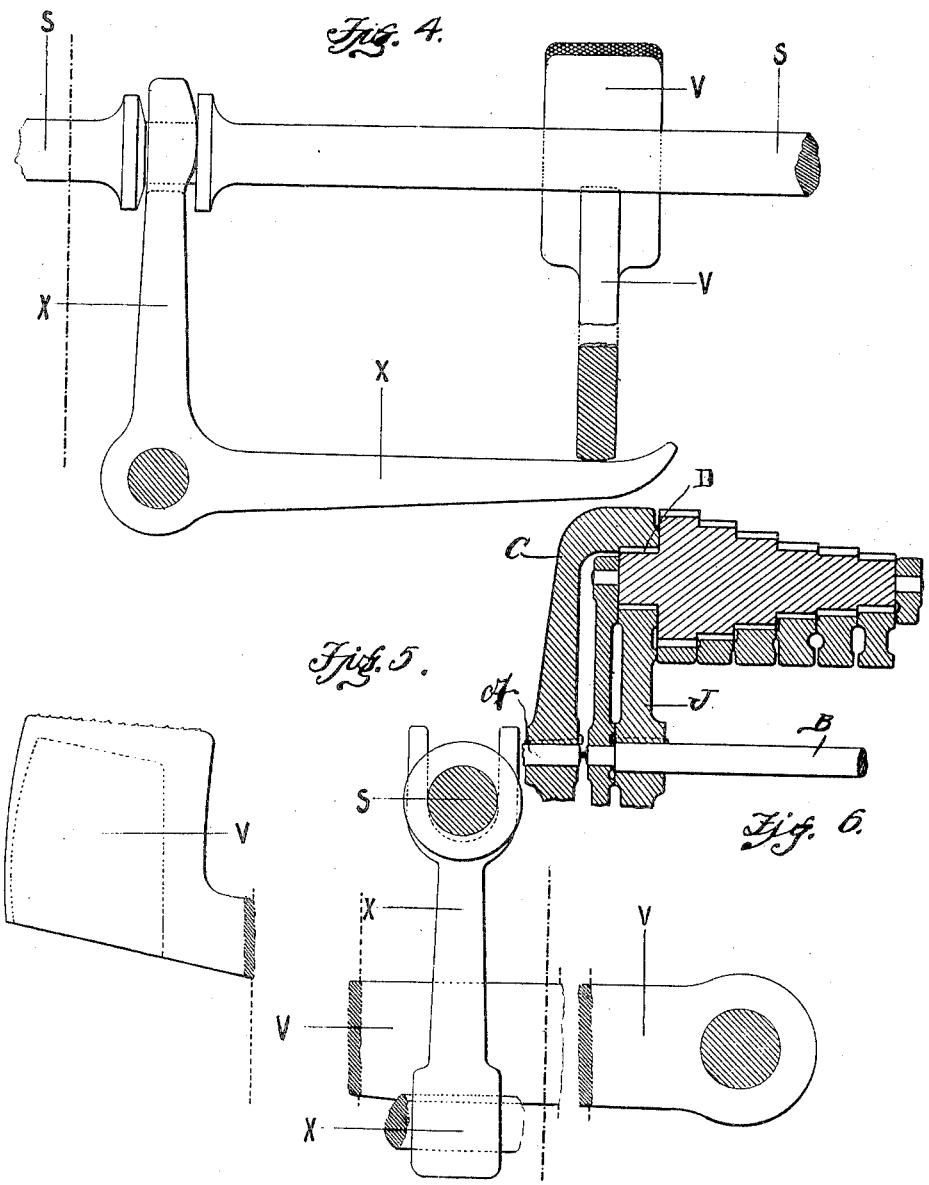

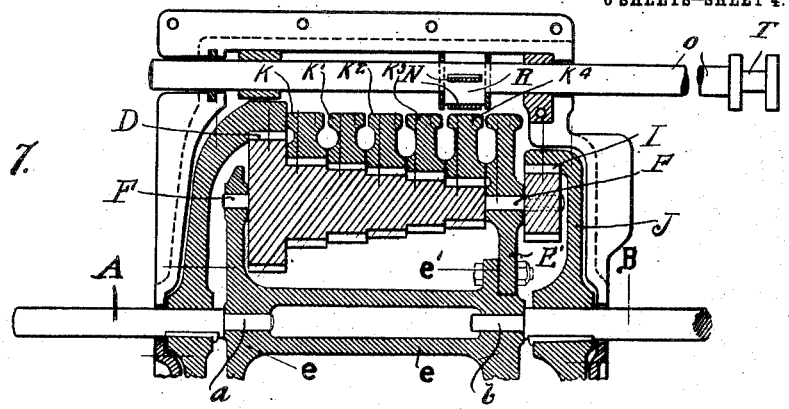
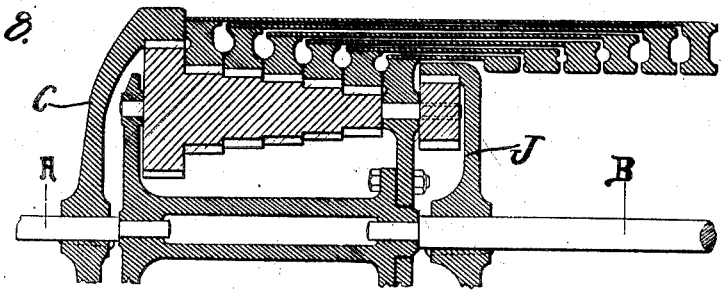
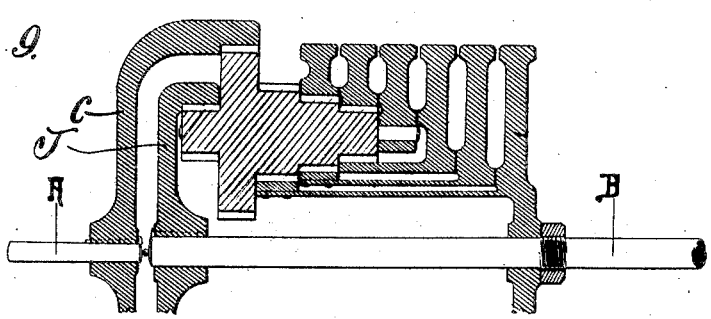
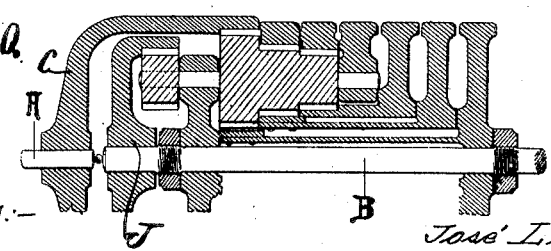

J. L. DE BRIONES.
SPEED CHANGING MECHANISM.
APPLICATION FILED JULY 28, 1908.

1,009,954.

Patented Nov. 28, 1911.

6 SHEETS—SHEET 6.

UNITED STATES PATENT OFFICE.

JOSÉ LUIS DE BRIONES, OF CARTHAGENA, SPAIN.

SPEED-CHANGING MECHANISM.

1,009,954.   Specification of Letters Patent.   Patented Nov. 28, 1911.

Application filed July 28, 1908. Serial No. 445,784.

*To all whom it may concern:*

Be it known that I, JOSÉ LUIS DE BRIONES, a subject of the King of Spain, and a resident of Carthagena, Province of Murcia, Spain, have invented certain new and useful Improvements in Speed - Changing Mechanism for Use with a Driving and a Driven Shaft, of which the following is a specification.

This invention relates to improvements in speed changing mechanism and the object thereof is to produce a simple and efficient mechanism of this character and in which one mechanism only is necessary, and by which injurious stresses while insuring the coupling of the parts is avoided, also resistance due to the use of eccentric trains and to the forming of toothed wheels in and out of gear by means of auxiliary pinions, which latter is often attended by accidents and damage to the mechanism.

The improved train of gearing comprises the following elements:—a driving shaft, a driven shaft, a train of planetary toothed wheels connecting these shafts, satellite pinions mounted coaxially with said planetary toothed wheels, gears engaging said satellite pinions and provided with peripheral brake surfaces, and a brake normally out of operation adapted to act at will on any one of said peripheral surfaces whereby when the brake is inoperative the driven shaft is at rest, and when the brake is operative the motion of the driving shaft is transmitted to the driven shaft with the speed dependent on the corresponding gear which is being held by the brake.

The accompanying drawings illustrate a special embodiment of this invention as applied to an automobile designed to have four speeds for forward travel, and one speed for rearward travel, the stoppage of the automobile being effected by removing the brake from the gears.

Figure 1:
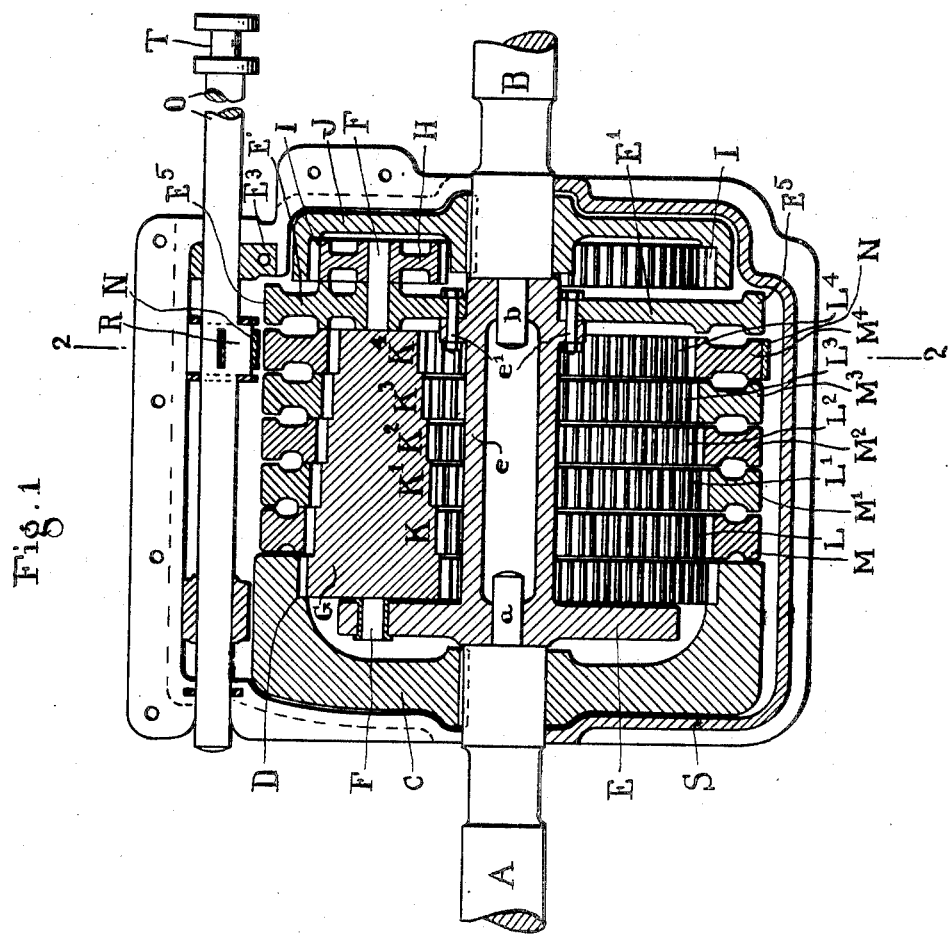
Figure 11:
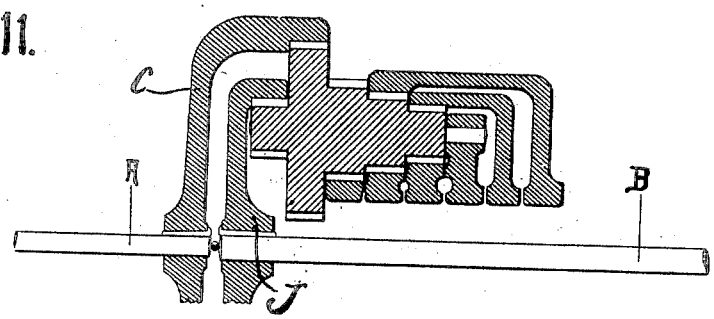
Figure 5:
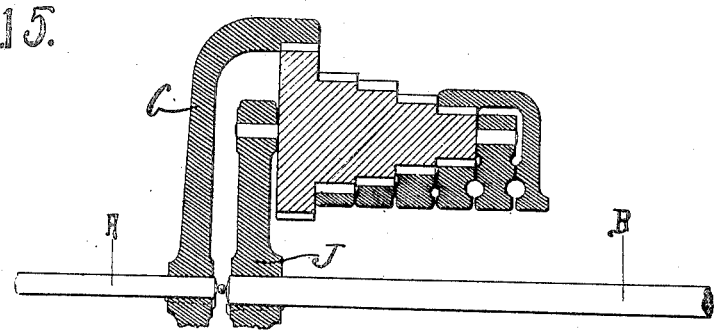
Figure 6:
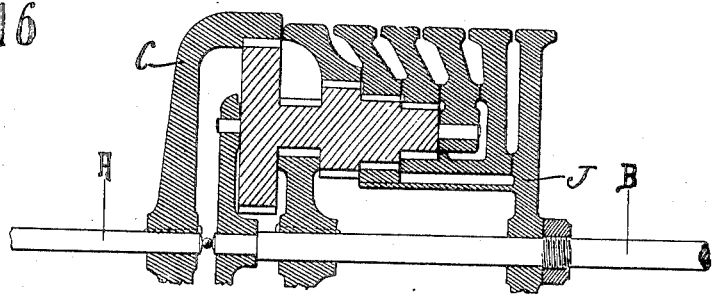
Figure 7:
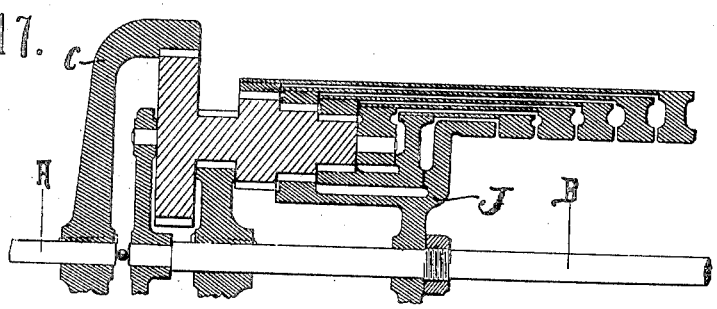
Figure 8:
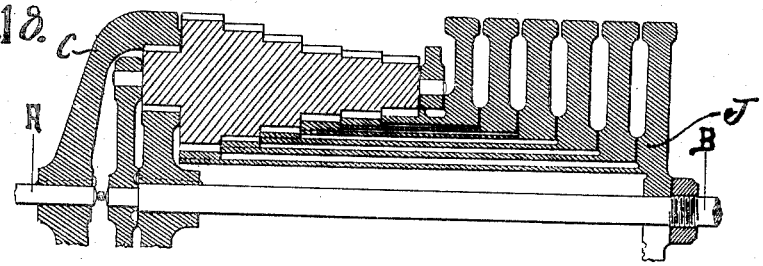

In the drawings, Figure 1 is a longitudinal section of one form of this improved mechanism taken on the line 1—1 of Fig. 3; Fig. 2 is a front elevation partly in section, of this improved gearing; Fig. 3 is a cross sectional view obtained by rotating the two half sections through 180° relative to each other in order to avoid their superposed position; Fig. 4 is a side elevation partly in section of the uncoupled pedal; Fig. 5 is a front elevation partly in section of the uncoupled pedal; Figs. 6 to 18 inclusive, represent diagrammatical vertical longitudinal sections of a variety of modifications and illustrate the practical application of the various devices composed of ordinary cylindrical wheels.

In the embodiment shown in Figs. 1 to 5, A (see Fig. 1) is the driving shaft, and B is the driven shaft coaxial therewith. C is a disk, which is preferably made heavy to act as a fly-wheel; it is keyed on the shaft A and is formed with an integral ring of teeth D. E is a disk mounted to rotate on the end $a$ of the shaft A, and having a barrel $e$, mounted to rotate on the end $b$ of the shaft B. E' is a disk mounted on the barrel $e$, and bolted thereto by means of a flange $e'$. F is a planet shaft capable of rotating in the disks E E'. G is a toothed planet wheel fixed near one end of the shaft F, engaging with the internal teeth D of the disk C. H is a toothed planet wheel fixed on the other end of the shaft F outside the disk E', engaging with the internal teeth I of a disk J keyed on the shaft B. K, K', $K^2$, $K^3$, $K^4$ are satellite pinions located between the planet wheel G and the disk E'. They are coaxial with the planet wheel G and are fixed on the planet shaft F. In the construction shown in Figs. 1, 2, and 7 the wheel G and pinions K' to $K^4$ are made in one piece with the shaft F. The pinions K, K', $K^2$, $K^3$, $K^4$, engage respectively with the internal gears L, L', $L^2$, $L^3$, $L^4$ of brake pulleys M, M', $M^2$, $M^3$, $M^4$, mounted coaxially with the shafts A and B. Each gear L to $L^4$ can be held stationary by friction applied to its respective brake pulley K to $K^4$ by means of a brake band N (see Figs. 1, 2 and 7). The disk E' is formed peripherally as a brake pulley $E^5$, which can likewise be held stationary by means of the brake band N. The brake band N is circular and divided in two separately operated half circles for the purpose of rendering the braking stress symmetrical and therefore balanced relatively to the fixed framing of the mechanism. The brake band N (Figs. 1, 3 and 7) is operated from the outside and is shifted on to each pulley M to $M^4$ or $E^5$, by means of two bars O, connected to the ends of each brake band half. The fixed end of each brake band half is connected to its respective bar O by means of the loop P (Fig. 3), which can be varied in length by means of the nut Q for the purpose of taking up wear. The other end of each brake band half is attached to a pin R, that is eccentric relatively to the bar O, so that a slight rotation of this bar will produce a tightening effect and thus cause engagement of the parts.

The whole mechanism hereinbefore described is inclosed in a gear case S to keep off dust and allow continuous lubrication. This gear case has merely fitted apertures for the driving and driven shafts and the engaging bars that are operated from the outside.

For the purpose of braking from the outside, the bars O are formed with grooves T in which engage the forked ends of two levers U pivoted on pins V to the operating shaft W. By the rotation of the operating shaft W in one or the other direction by means of a hand lever (not shown), the two levers U are swung (toward or away from the operator, Fig. 2), so as to shift the bars O longitudinally toward the left or right (Fig. 1) as the case may be. By this means the brake band N is shifted on to the requisite brake pulley M to $M^4$ or $E^5$. Then by operating the pedal X (Figs. 4 and 5) a bent lever Y is actuated to shift the shaft W longitudinally to the right (Fig. 4) against the action of the spring Z (Fig. 2), so as to rotate the bars O and thus tighten the brake band N on the said brake pulley M to $M^4$ or $E^5$, as the case may be. This arrests the said brake pulley, whereupon the driven shaft B is rotated at the speed ratio of the corresponding gear L to $L^4$. To loosen the brake, the pedal X is released, and the spring Z returns the shaft W to the left (Fig. 2). Suitable means are provided for locking the mechanism in position at each speed.

In the operation of the mechanism, so long as none of the brake pulleys M to $M^4$, $E^5$ is held by the brake N, the shaft A can rotate without driving the shaft B as the satellite pinions K to $K^4$ revolve idly around the gears L to $L^4$ respectively, and the wheel H revolves idly around the teeth I. If however any one of the brake pulleys M to $M^4$ or $E^5$ be held, that is, rendered stationary by the application of the brake N thereto, the corresponding gear (L to $L^4$) will also be held, and the corresponding satellite pinion (K to $K^4$) engaging with the said gear will be caused to rotate on its own axis at a speed depending upon the ratio of the satellite pinion (K to $K^4$) and the gear (L to $L^4$) respectively to the planet wheels G, H. The shaft B will be driven at a speed and in a direction depending on the proportions of the gears. For the purpose of balancing the strains two or more sets of planet wheels G, H, and satellite pinions (K to $K^4$) may be arranged equidistantly in a circle around the driven shaft B, engaging with the wheels C and J and gears L to $L^4$ common to all the said sets.

A number of obvious embodiments of the invention are illustrated diagrammatically in the drawings. Thus in all the Figs. 6 to 18, the driving wheel on the driving shaft A is an internally toothed wheel engaging an externally toothed driving planet wheel fixed on the planet shaft.

In Figs. 7, 8, 9, 10 and 11, the driven wheel J on the driven shaft B is an internally toothed wheel engaging an externally toothed driven planet wheel fixed on the planet shaft.

Figure 12:
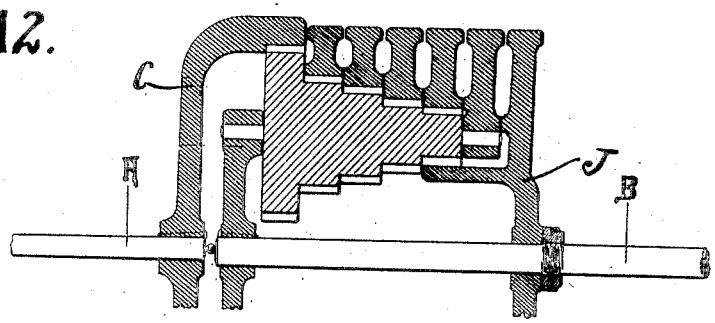
Figure 13:
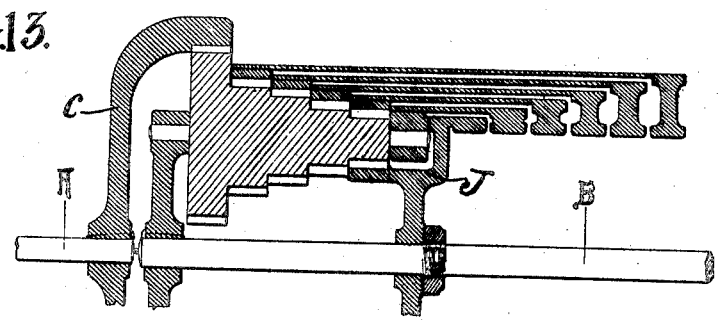
Figure 14:
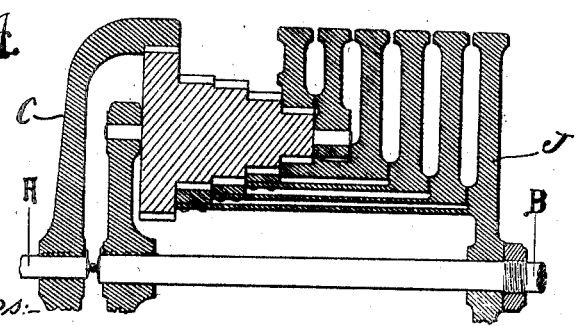

In Figs. 12, 13 and 14 the driven wheel J on the driven shaft B is an externally toothed wheel engaging one of the satellite pinions.

In Fig. 15, the driven wheel J fixed on the driven shaft B, is constructed in the form of a disk in which the planet shaft is rotatably mounted.

In Fig. 16, the driven wheel J fixed on the driven shaft B is an externally toothed wheel engaging an externally toothed driven planet wheel.

In Figs. 17 and 18, the driven wheel J fixed on the driven shaft B is an externally toothed wheel engaging the externally toothed driving planet wheel.

Having now described my invention what I claim as new and desire to secure by Letters Patent is:—

1. In a speed changing train of gearing, the combination with a driving shaft and a driven shaft, of an internally toothed driving wheel fixed on the driving shaft, a toothed driven wheel fixed on the driven shaft, a rotary member provided with a circular braking surface coaxial with the driven shaft, a planet shaft rotatably mounted in said rotary member, a driving toothed planet wheel fixed on said planet shaft, engaging said internally toothed driving wheel, a plurality of satellite pinions and a driven toothed planet wheel fixed on said planet shaft, said driven planet wheel engaging said toothed driven wheel, a plurality of gears coaxial with the driven shaft, each engaging one of said satellite pinions and each provided with a circular braking surface, a brake normally out of operation, and means for shifting said brake into and out of engagement with any one of said circular braking surfaces at will whereby when said brake is inoperative, the driven shaft is at rest, and when the brake is operative the driven shaft is rotated at a speed and in the direction determined by that of the gear which is held by said brake, as set forth.

2. In a speed changing train of gearing, the combination with a driving shaft and a driven shaft, of an internally toothed driving wheel fixed on the driving shaft, an internally toothed driven wheel fixed on the driven shaft, a rotary member provided with a circular braking surface coaxial with the driven shaft, a planet shaft rotatably mounted in said rotary member, a driving toothed planet wheel fixed on said planet shaft, engaging said internally toothed driving wheel, a plurality of satellite pinions and a driven toothed planet wheel fixed on said planet shaft, said driven planet wheel engaging said toothed driven wheel, a plurality of gears coaxial with the driven shaft, each engaging one of said satellite pinions and each provided with a circular braking surface, and a brake normally out of operation adapted to be shifted into and out of engagement with any one of said circular braking surfaces at will, as set forth.

3. In a speed changing train of gearing, the combination with a driving shaft and a driven shaft, of an internally toothed driving wheel fixed on the driving shaft, an internally toothed driven wheel fixed on the driven shaft, a rotary member provided with a circular braking surface coaxial with the driven shaft, a planet shaft rotatably mounted in said rotary member, a driving planet wheel and a driven planet wheel fixed on said planet shaft and engaging respectively said internally toothed driving and driven wheels, a plurality of satellite pinions fixed on said planet shaft, a plurality of gears coaxial with the driven shaft each engaging one of said satellite pinions, and each provided with a circular braking surface, and a brake normally out of operation adapted to be shifted into and out of engagement with any one of said circular braking surfaces at will, as set forth.

4. In a speed changing train of gearing the combination with a driving shaft and a driven shaft, of an internally toothed driving wheel fixed on the driving shaft, a rotary member fixed on the driven shaft, a planet shaft rotatably mounted in said rotary member, a driving toothed planet wheel fixed on said planet shaft engaging said internally toothed driving wheel, a plurality of satellite pinions fixed on said planet shaft, a plurality of gears coaxial with the driven shaft, each engaging one of said satellite pinions, and each provided with a circular braking surface, a rotary member loose on the driven shaft, provided with a circular braking surface and with a ring of teeth engaging one of said satellite pinions, and a brake normally out of operation adapted to be shifted into and out of engagement with any one of said circular braking surfaces as set forth.

5. In a speed changing train of gearing, the combination with a driving shaft and a driven shaft, of an internally toothed driving wheel fixed on the driving shaft, a rotary member fixed on the driven shaft, a planet shaft rotatably mounted in said rotary member, a driving toothed planet wheel fixed on said planet shaft engaging said internally toothed driving wheel, a driven toothed planet wheel and a plurality of satellite pinions fixed on said planet shaft, a driven toothed wheel fixed on the driven shaft, engaging said driven planet wheel, a plurality of gears coaxial with the driven shaft, each engaging one of said satellite pinions and each provided with a circular braking surface, a rotary member loose on the driven shaft, provided with a circular braking surface and with a ring of teeth engaging one of said satellite pinions, and a brake normally out of operation adapted to be shifted into and out of engagement with any one of said circular braking surfaces, as set forth.

In testimony whereof I have hereunto set my hand in presence of two subscribing witnesses.

JOSÉ LUIS DE BRIONES.

Witnesses:
E. C. MORÁ,
ANTONIO BERNABEN.